United States Patent [19]

Muendlein et al.

[11] Patent Number: 5,251,511
[45] Date of Patent: Oct. 12, 1993

[54] TOOL HEAD FOR USE IN MACHINE TOOLS

[75] Inventors: Werner Muendlein, Bietigheim-Bissingen; Gerhard Scheer, Loechgau; Gerhard Stolz, Ingersheim, all of Fed. Rep. of Germany

[73] Assignee: KOMET Praezisionswerkzeuge Robert Breuning GmbH, Besigheim, Fed. Rep. of Germany

[21] Appl. No.: 835,442

[22] PCT Filed: Aug. 24, 1990

[86] PCT No.: PCT/EP90/01416

§ 371 Date: Feb. 21, 1992

§ 102(e) Date: Feb. 21, 1992

[87] PCT Pub. No.: WO91/03345

PCT Pub. Date: Mar. 21, 1991

[30] Foreign Application Priority Data

Sep. 9, 1989 [DE] Fed. Rep. of Germany ....... 3930196

[51] Int. Cl.[5] .................. B23B 25/06; B23Q 17/22
[52] U.S. Cl. .......................... 82/1.2; 408/16; 408/152; 408/153; 408/179; 408/181
[58] Field of Search ............... 408/16, 152, 153, 179, 408/181; 82/1.2, 1.3, 1.4

[56] References Cited

U.S. PATENT DOCUMENTS

| 4,672,868 | 6/1987 | Rawle | 82/123 |
| 4,676,127 | 6/1987 | Watanabe | 408/16 |
| 4,741,230 | 5/1988 | Bohner et al. | 82/1.2 |
| 4,742,738 | 5/1988 | Strand | 82/1.11 |
| 4,913,602 | 4/1990 | Peter et al. | 408/147 |

FOREIGN PATENT DOCUMENTS

| 3408352 | 9/1985 | Fed. Rep. of Germany . |
| 3526712 | 1/1987 | Fed. Rep. of Germany . |
| 3607771 | 9/1987 | Fed. Rep. of Germany . |
| 3611447 | 10/1987 | Fed. Rep. of Germany . |

Primary Examiner—William E. Terrell
Attorney, Agent, or Firm—Flynn, Thiel, Boutell & Tanis

[57] ABSTRACT

The invention concerns an adjustable tool for use in machine tools, with a slide (14) which can be fitted with at least one cutting tool and which can be displaced relative to the rotating main body (10) perpendicularly to the axis of rotation. The invention also calls for a device (20) for the direct measurement of the displacement of the slide (14), the slide being fitted with an electronically read measurement scale (24). This device comprises battery-powered data-processing electronics (20) and is located inside the main body (10). The displacement reading can be presented on a digital display (26) which is also mounted in the tool head.

32 Claims, 10 Drawing Sheets

FIG. 13

TOOL HEAD FOR USE IN MACHINE TOOLS

FIELD OF THE INVENTION

The invention relates to a tool head for use in machine tools comprising a main body rotating about an axis of rotation, at least one slide adjustable relative to the main body, preferably perpendicularly with respect to the axis of rotation, and equipped with at least one cutting tool, a device for the direct measuring of the displacement path of the slide relative to the main body and a device for evaluating and displaying the results of the path measurement.

BACKGROUND OF THE INVENTION

In order to be able to exactly adjust the slide and the cutting tool carried by it, it is necessary to exactly measure the displacement path of the slide. The displacement path is mostly measured indirectly in known tool heads by, for example, measuring the angular path of a spindle driving the slide and concluding from this the stretch covered by the slide. Inexactnesses in the path measurement are thereby created due to unavoidable tolerances which have negative effects on the exact position of the cutting tool and the reproducability of the adjustment.

In order to avoid this disadvantage, it is already known, for a tool head of the above-disclosed type (DE-OS 35 26 712), to measure the displacement path of the slide relative to the housing directly through an optical scanning of an incremental glass measuring rod fixedly connected to the slide by a sensing head arranged in the main body. The measuring light for the optical scanning of the measuring scale is thereby guided through a photoconductor from outside into the inside of the tool head. The light signals from the glass measuring rod on the scanning element are also introduced into a further measuring light conductor connected to an evaluating electronics device arranged outside of the rotating main body for evaluating the results of the path measurement. Because of the relatively complicated optoelectronic connecting technique, handling of the known tool head is complicated and cannot easily be automated. In addition, the reading of the results of the path measurement requires a stationary installation so that the use of the known tool head is limited to certain machine tools containing this installation.

Starting out from this, the basic purpose of the invention is to provide a tool head of the abovementioned type which can be universally utilized and guarantees a breakdown-free and exact displacement path display.

The solution of the invention is, among others, based on the recognition that a universal use of the tool head is only possible when the measuring and evaluating electronics device for the direct displacement path measurement is moved inside of the main body and the particularities of the operation on high-speed machine tools are considered.

Thus, a first modification of the invention suggests that the main body has a recess for receiving a battery-operated scanning and evaluating electronics device and a radially outwardly facing digital display and that the electronics device in the recess is sealed off at its periphery by a shell completely surrounding the main body, and having a viewing window for the digital display.

The shell can thereby be designed as a metal sleeve shielding the electronics device, which shell in the area of the digital display has a window opening and is lined on its inside surface with at least one annular acrylic-glass layer. The acrylic-glass layer can be glued to the metal shell or it can be injection molded into same. Furthermore, it is advantageous for the handling of the adjusting mechanism when preferably in the area of the window opening at least one externally accessible operating switch for controlling the scanning and evaluating electronics device in the shell is provided and which is externally sealed off against liquid. With the operating switch it is possible, for example to release the functions of a zero position or effecting a changing over between different measuring systems (metric measurement or inch measurement). Such a tool head suffices completely without external devices and can therefore be used particularly easily and universally.

It is furthermore suggested according to a second modification of the invention that the main body has a recess, which is open toward the measuring scale of the slide, to receive a battery-operated scanning and evaluating electronics device, that in addition a transmitting and receiving electronics device connected to the scanning and evaluating electronics device is arranged in the same or a further recess in the main body, that the electronic circuits in the recess or in the recesses are externally sealed off by a shell completely surrounding the main body, that in an outwardly open and inwardly closed annular groove or in edge-open recesses of the shell, which recesses are distributed over the periphery, there are arranged distributed over the periphery optoelectronic transmitting and receiving elements connected to the transmitting and receiving electronics device, and that an external remote-control electronics device is provided which reacts to signals emitted by the transmitting and receiving electronics device and/or loads same with control signals. In order to guarantee in a high-speed tool head a uniform signal transmission and a uniform reception, the transmitting and receiving elements are, according to a preferred embodiment of the invention, arranged in a closed diffuser ring countersunk in the annular groove of the shell. This arrangement has, compared with the first modification, the advantage that even when the tool head rotates, a continuous reading or rather evaluating of the displacement path measured values is possible. This is particularly important when the slide is automatically adjusted, for example, through the tool spindle or through a motoric adjusting mechanism integrated into the tool head. By equipping the scanning and evaluating electronics device or the remote-control system with a microprocessor circuit and data store, it is furthermore possible with such an arrangement to relatively easily carry out a statistic process control (SPC). During the SPC, all measured data of a production process are transmitted into a processor for statistic evaluation. The measurement data can be temporarily stored and can from there be transmitted from time to time to a central processor for further evaluation.

A particularly effective seal of the recesses containing the electronic circuits is achieved when the shell is clamped between a shoulder on the main body and a flange by several axial clamping screws circumferentially spaced apart over the periphery, and extending through axial bores in the main body. Furthermore, it is important in both modifications of the invention that a hermetically sealable battery compartment is arranged in the main body.

The slide carries according to the invention a measuring scale and the main body carries a sensor scanning the measuring scale and connected to a scanning and evaluating electronics device. It is basically also possible for the main body to carry the measuring scale and the slide carry a sensor scanning the measuring scale and connected to the scanning and evaluating electronics device. It has now been proven that for an exact length measurement with capacitive and optical measuring systems, in which two scales are moved relative to one another and are scanned, the parts moved relative to one another must be every exactly associated with one another. When the parts rotate, care is taken that the acceleration and centrifugal forces acting onto the parts are compensated for in order not to obtain a speed-dependent length measurement. According to a preferred embodiment of the invention, it is therefore suggested that the measuring scale and the sensor be arranged neutral with respect to the centrifugal force in the direct vicinity of the axis of rotation of the main body. The measuring scale and the sensor are thereby advantageously arranged in planes facing one another, separated by a narrow gap from one another, and perpendicular with respect to the axis of rotation, with the axis of rotation extending through said planes. In view of the exactness in measurement, it is advantageous when the gap width is less than 20 $\mu$m, preferably less than 10 $\mu$m. When the measuring scale and the sensor are parts of a capacitive length-measuring device connected to the scanning and evaluating electronics device, the gap can be filled with a preferably highly viscous dielectric which does permit a movement of the two parts toward one another, however, is not urged out of the gap under the action of centrifugal force acting on the rotating tool.

The measuring structures forming the measuring scale and the sensor are advantageously arranged on a glass carrier, preferably are applied to same by means of a thin-layer technique. Due to the high form stability and the low thermal expansion coefficient of glass, mechanical and thermal influences on the path measurement result are kept low. On the other hand, care must be taken that the sensor or the measuring scale is fastened to a mounting surface of the main body or to the slide which is aligned exactly perpendicularly with respect to the axis of rotation. In order to achieve this, the flat glass carrier can, according to an advantageous embodiment of the invention, be glued with its active surface to two spaced mounting bars, while the free ends of mounting bars which project beyond an edge of the glass-carrier can be fastened, preferably clamped, to the mounting surface, which mounting surface is provided with a recess for receiving the glass carrier which faces toward the main body. In order to enable a collision-free movement of the slide, recesses to receive the mounting bars are arranged in the slide. Furthermore, a mounting surface for the glass carrier of the measuring scale or the sensor can be provided on the slide, which mounting surface is aligned perpendicularly with respect to the axis of rotation, with the glass carrier being able to be mounted onto bolts projecting from the mounting surface, being able to be pressed flat against the mounting surface and, if necessary, being able to be connected to same by means of moldable resin.

According to a further advantageous embodiment of the invention, a radially aligned battery compartment arranged in the main body to receive a flashlight battery and having a pole rod arranged near the axis and radially movable against the force of a radially inwardly, initially tensioned, spring and a metallic compartment lid preferably designed as a grounded pole screw threadedly sealed off against liquid to the main body. These precautions guarantee an essentially centrifugal-force-neutral arrangement of the flashlight battery supported on the compartment lid and the length tolerances of which are balanced compensating the centrifugal force by the spring-loaded pole rod. The pole rod can thereby be movably supported in an insulating plastic part inserted into a main body recess.

According to a further preferred embodiment of the invention, the shell surrounding the main body consists of an impact-resistant, preferably glass-fiber-reinforced plastic, in which is arranged a viewing window for the digital display. The viewing window is thereby advantageously arranged in a flat part of the otherwise cylindrical shell. Furthermore, it is possible to arrange near the viewing window, preferably in the flat part of the shell, externally operable switches to control the scanning and evaluating electronics device. The shell can be clamped advantageously between an annular shoulder on the main body and a flanged lid connectable to the main body. The viewing window is slightly radially recessed in the housing. The same is true for the switches projecting from the shell in the area of the viewing window. In order to avoid incorrect operations or damage to the viewing window and the switches, the annular shoulder and the flanged lid project at least in the flat area radially beyond the outer surface of the shell.

An adjusting mechanism for the slide is provided according to the invention for a fine adjustment and which includes a spindle supported off-center in the main body and carries a guide structure in the form of a helical tooth system and a counterpart provided with a complimentary helical tooth system and fixedly connected to the slide. The helically-toothed counterpart can, during a premounting, be first connected floatingly to the slide and can be moved into a clearance free, direction-exact orientation with the helically toothed guide structure. In this position, it is then possible to fixedly connect the helically toothed counterpart with the slide, for example, by injection molding with a moldable resin, and, if necessary, it is possible to subsequently weld the counterpart to same.

The scanning and evaluating electronics device can, according to the invention, be equipped with a digital store which, in connection with the path-measuring device and the digital display, is used, according to the invention, to determine and store the following values:

a relative value scannable on the measuring scale by means of a sensor, and defining the displacement path of the slide relative to the main body, which relative value can be set to zero in any desired displacement position of the slide, can be stored in the digital store and can be called from same into the digital display;

an absolute value scannable on the measuring scale by means of a sensor, and defining the absolute position of the slide relative to the main body, in the zero position of which absolute value the tool is balanced and which can be stored in the digital store and can be called from same into the digital display;

an absolute real measurement, which can be stored in the digital store and can be called from same into the digital display.

BRIEF DESCRIPTION OF THE DRAWINGS

The invention will be described in greater detail hereinafter in connection with several exemplary embodiments schematically illustrated in the drawings, in which.

DETAILED DESCRIPTION

The precision rotary head illustrated in the drawings consists essentially of a main body 10, a rigid fitting pin 12, preferably integrally connected to the main body 10, for connecting the rotary head to a rotatingly driven clamping device of a machine tool (not illustrated), a slide 14 adjustable relative to the main body perpendicularly with respect to an axis of rotation of the precision rotary head and carrying therewith a receiving device 16 for a cutting tool, and an electronic measuring and evaluating device 20 for facilitating a measuring of the displacement path of the slide 14 and, further, evaluating the results of the measurement.

The slide 14 in the illustrated exemplary embodiments is moved relative to the main body by a manually rotatable, threaded spindle 22 supported fixed against movement in the main body. On one of the longitudinal side surfaces of the slide there is provided a measuring scale 24 electronically scannable by a sensor 23 electrically connected to the electronics device 20 and, for example, is designed as a linear capacitive measuring scale. The measuring and evaluating electronic device 20 has furthermore, in the exemplary embodiments, a radially outwardly facing digital display 26 which is, for example, an LED or LCD indicator. The electronics device 20, which is preferably molded in plastic, is in the case of FIGS. 1 to 5 fixedly connected to a fill member 28 which is movably arranged in a recess 18 of the main body 10 for the purpose of facilitating an adjustment of a sensing head relative to the measuring scale 24. The recess 18 is sealed off toward the outside against liquid by a shell 30 of fine steel (FIGS. 1 to 5) or of plastic (FIGS. 8 to 11), which shell is clamped between an annular shoulder 32 on the main body 10 and an annular flanged lid 34 fastenable to the main body 10 by means of several circumferentially spaced screws. The metallic shell 30 (FIGS. 1 to 5) fulfills thereby at the same time the function of shielding the electronics device 20 against external electric fields, like a Faradayic cage. A radially inside surface of the shell 30 has a stepped recess lined with an acrylic-glass ring 36. The acrylic-glass ring 36 can be either glued or injection molded into the shell 30. The shell 30 has furthermore a window opening 38. The fill member 28 also has an opening 40. The digital display 26 is visible from the outside through the openings 40 and 38. An index screw 42 assures that the shell 30 with its window 38 is exactly aligned in peripheral direction on the main body 10 with the opening 40. The electronics device 20 is supplied with current through head cells 44 or a flashlight battery 44' arranged in a battery housing 46 hermetically sealed off from the outside. To operate the electronic device, radially outwardly facing switches 48, 50 are provided, which switches are accessible to the outside and extend through bores in the fill member 28, in the acrylic-glass layer 36 and in the shell 30 and are sealed off to the outside against liquid. One of the switches 50 activates the electronics device 20 and sets the digital display to zero, while a change over between millimeter and inch measurements can be carried out by the other switch 48.

Figure 1:
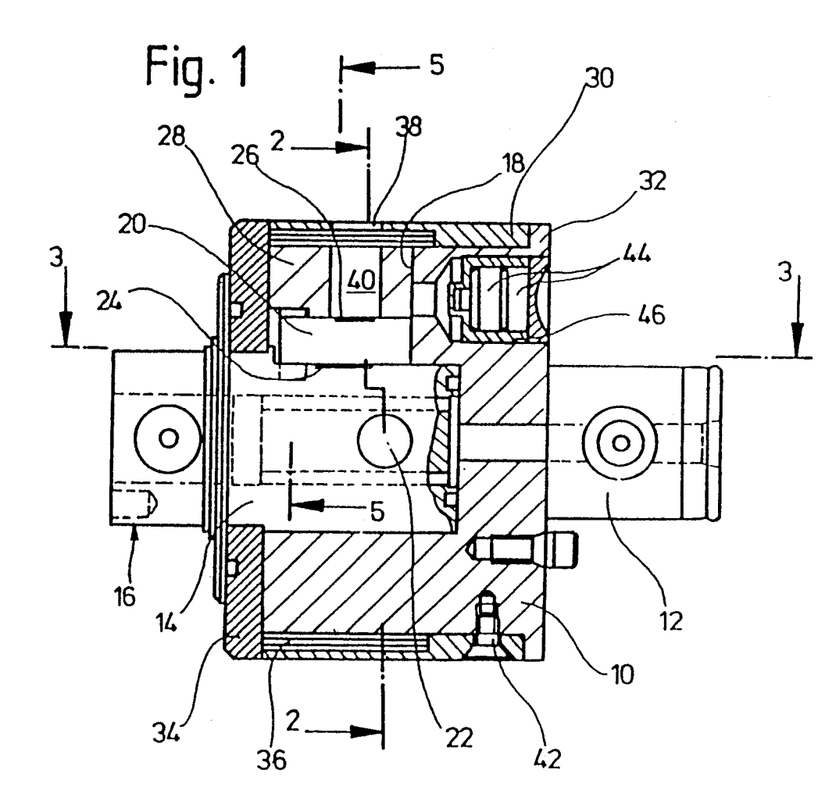
FIG. 1 is a cross-sectional view of a precision rotary head having an adjusting mechanism and a digital display.
Figure 2:
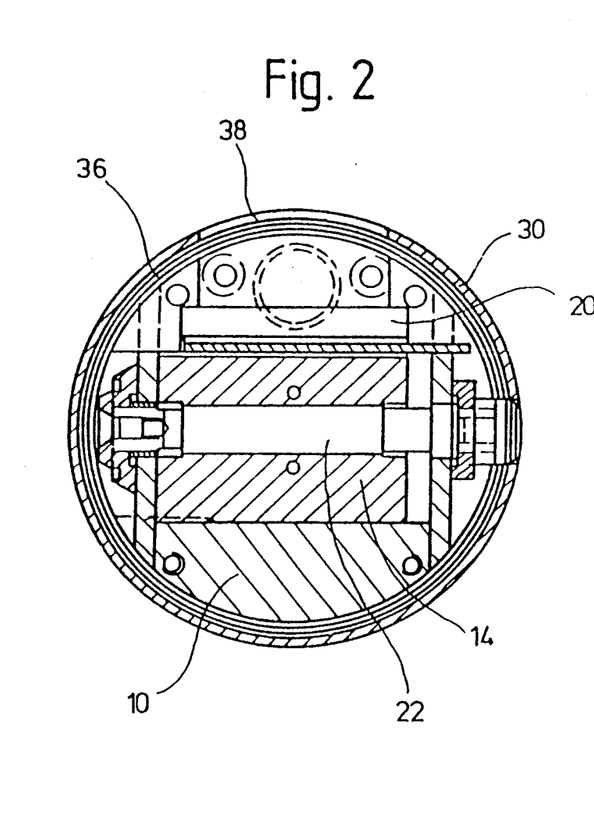
FIG. 2 is a cross-sectional view taken along the section line 2—2 of FIG. 1.
Figure 3:
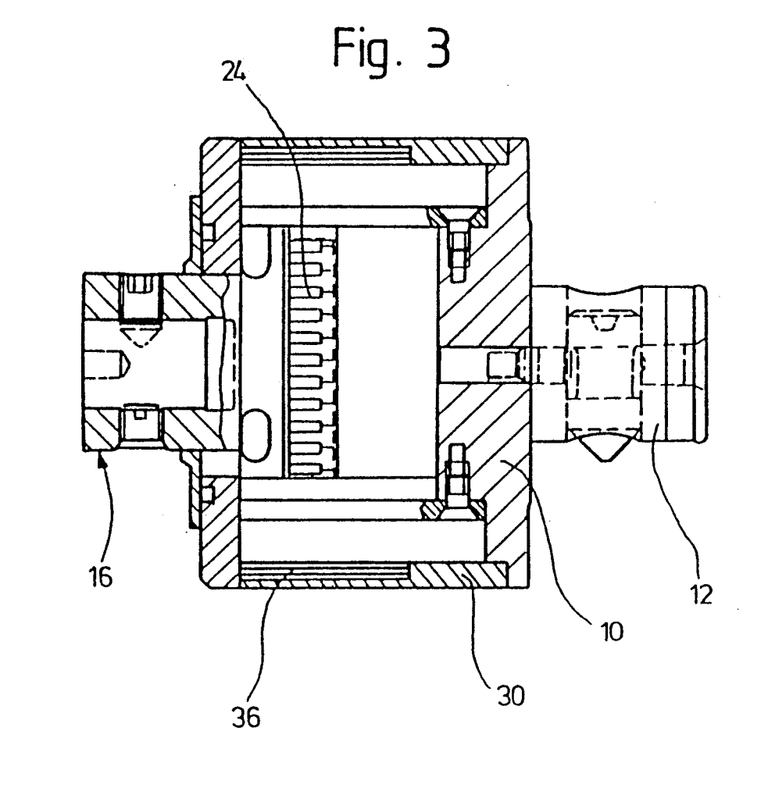
FIG. 3 is a cross-sectional view taken along the section line 3—3 of FIG. 1.
Figure 4:
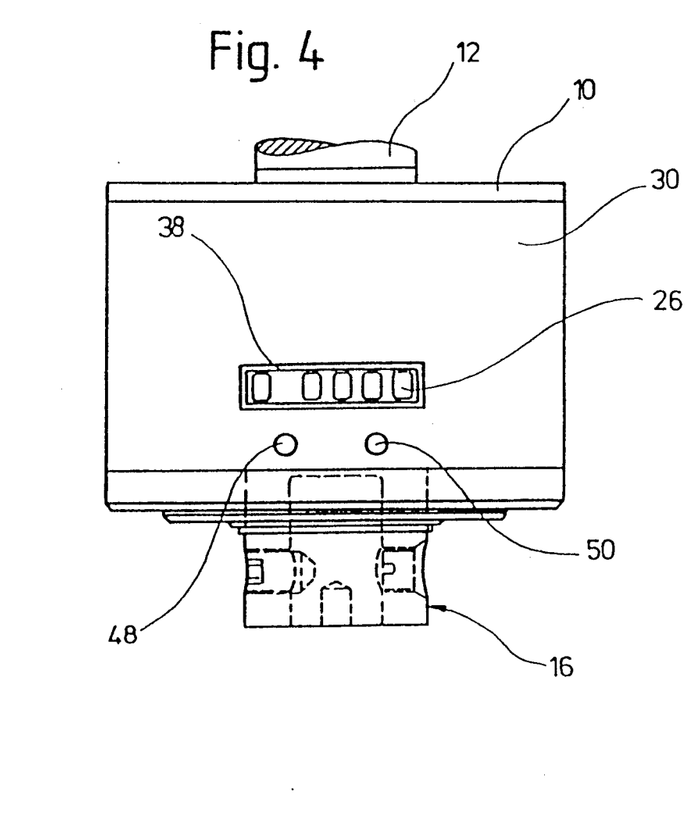
FIG. 4 is a side view of the precision rotary head according to FIGS. 1 to 3.
Figure 5:
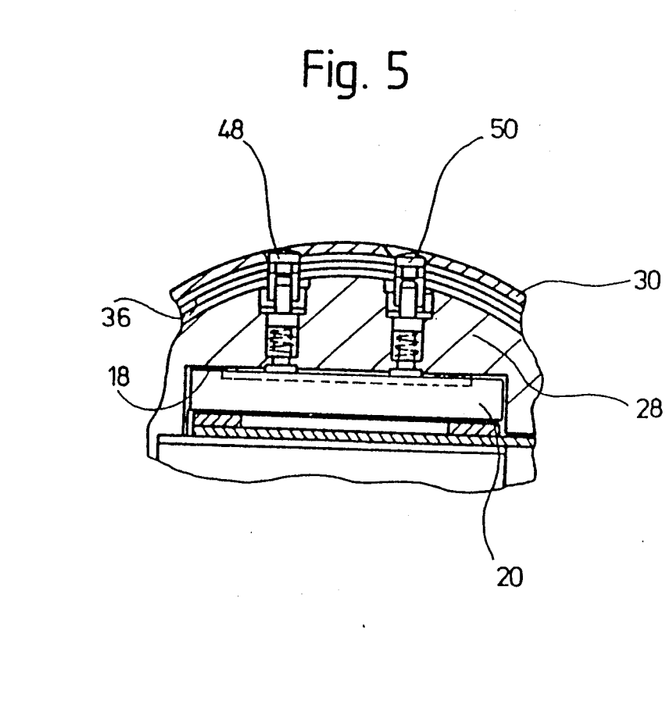
FIG. 5 is a cross-sectional view taken along the section line 5—5 of FIG. 1.
Figure 6:
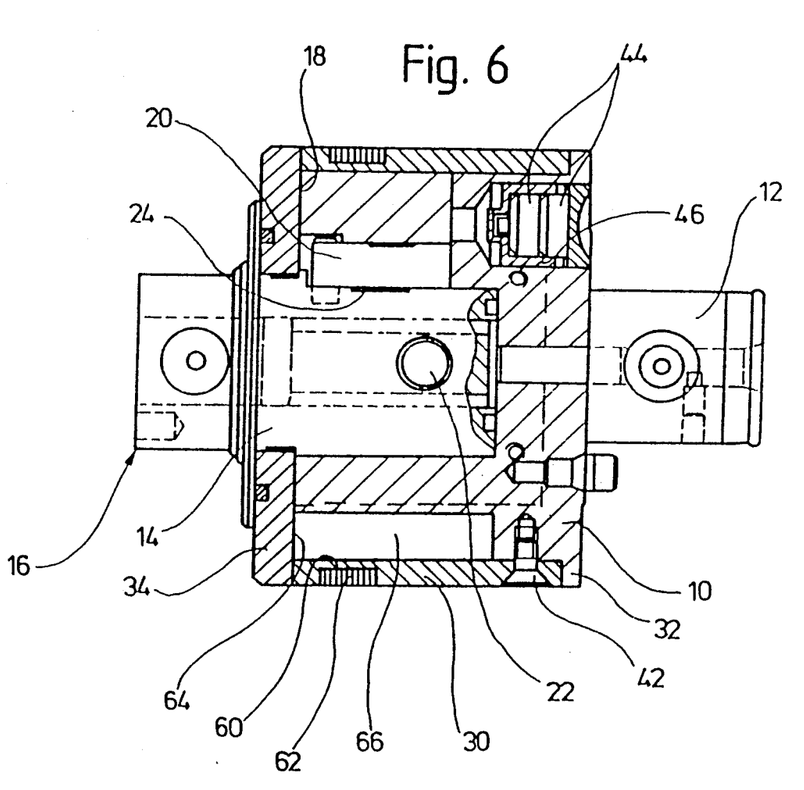
FIG. 6 is a cross-sectional view of a precision rotary head having an adjusting mechanism and an optoelectronic transmitting and receiving system in an illustration corresponding to FIG. 1.
Figure 7:
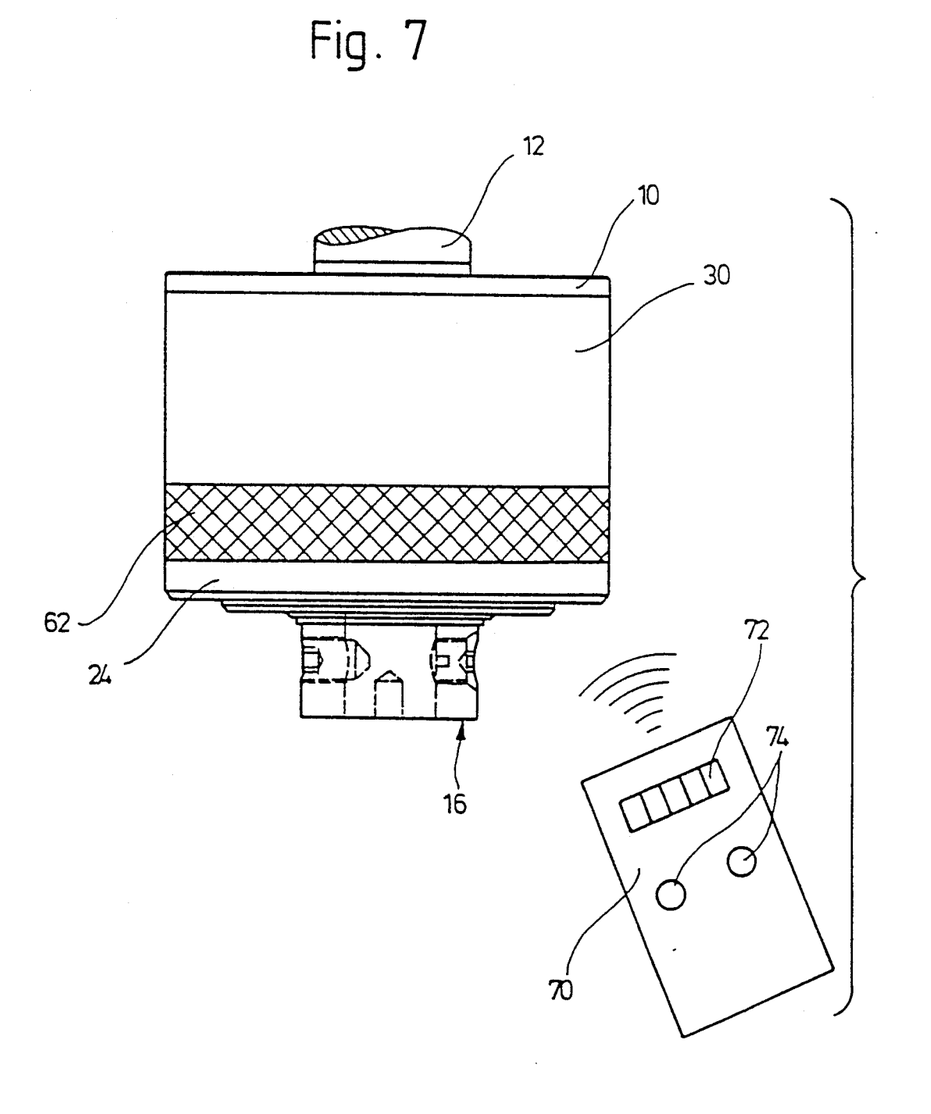
FIG. 7 is a side view of the precision rotary head according to FIG. 6.
Figure 8:
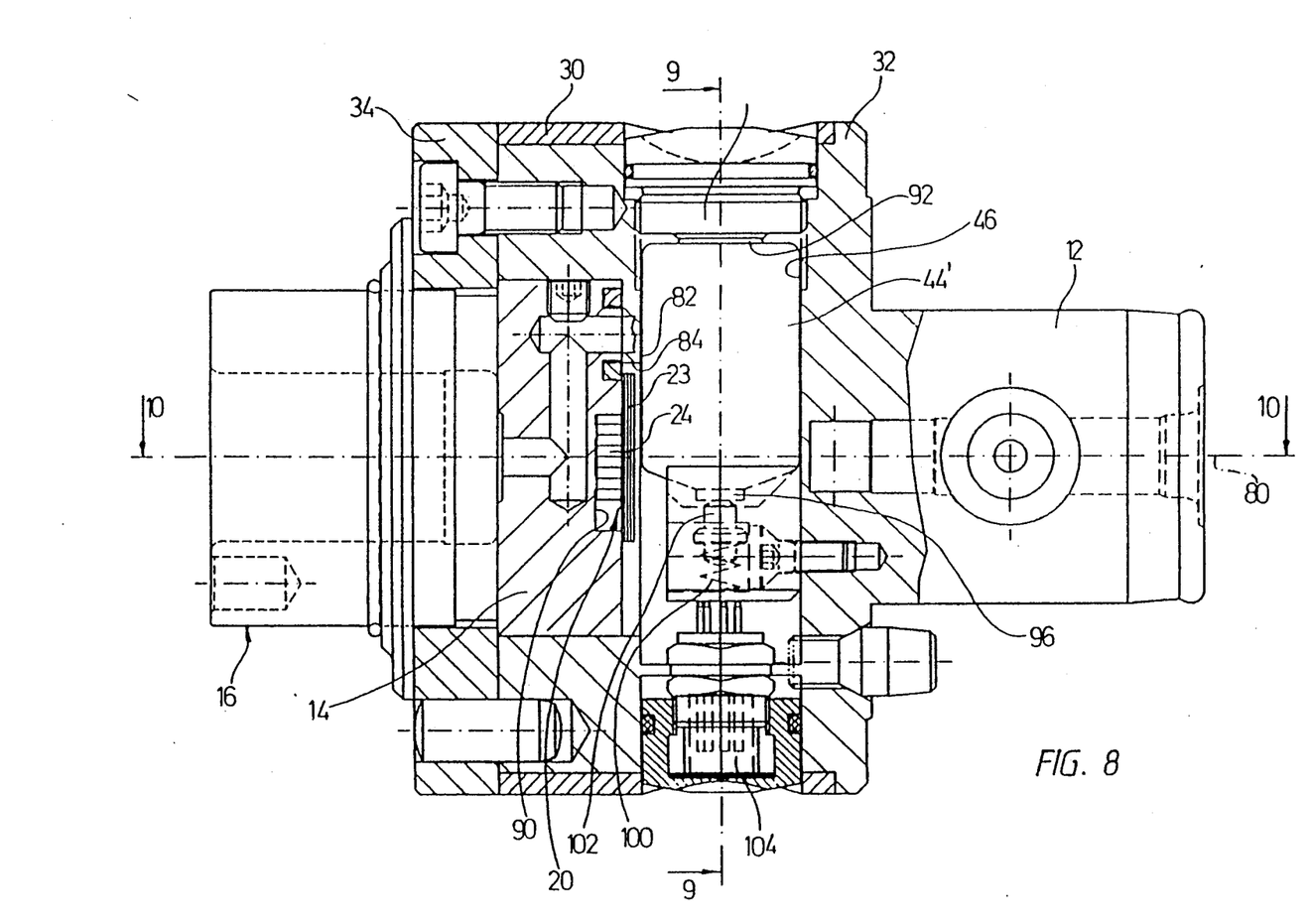
FIG. 8 is a cross-sectional view of a further exemplary embodiment of a precision rotary head having adjusting mechanism and a digital display.
Figure 9:
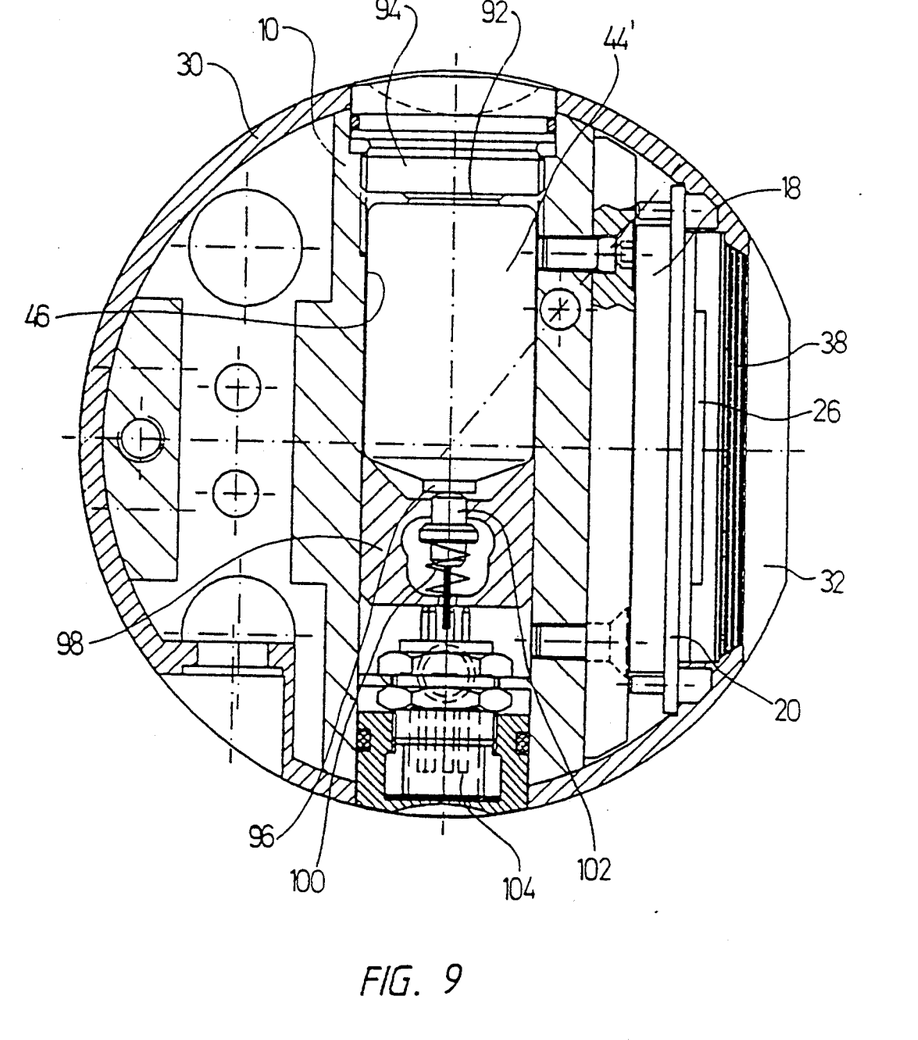
FIG. 9 is a cross-section view taken along the section line 9—9 of FIG. 8.
Figure 10:
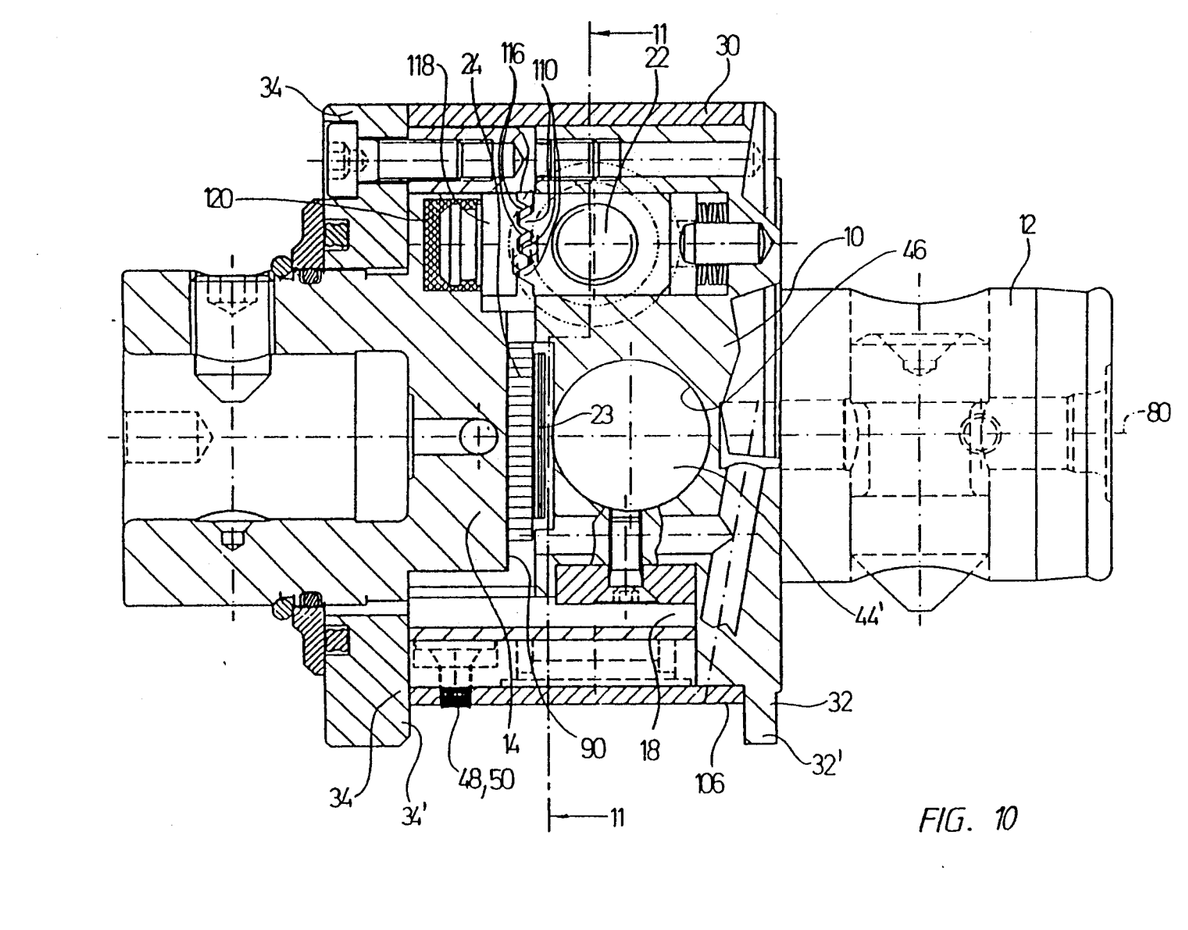
FIG. 10 is a cross-sectional view taken along the section line 10—10 of FIG. 8.
Figure 11:
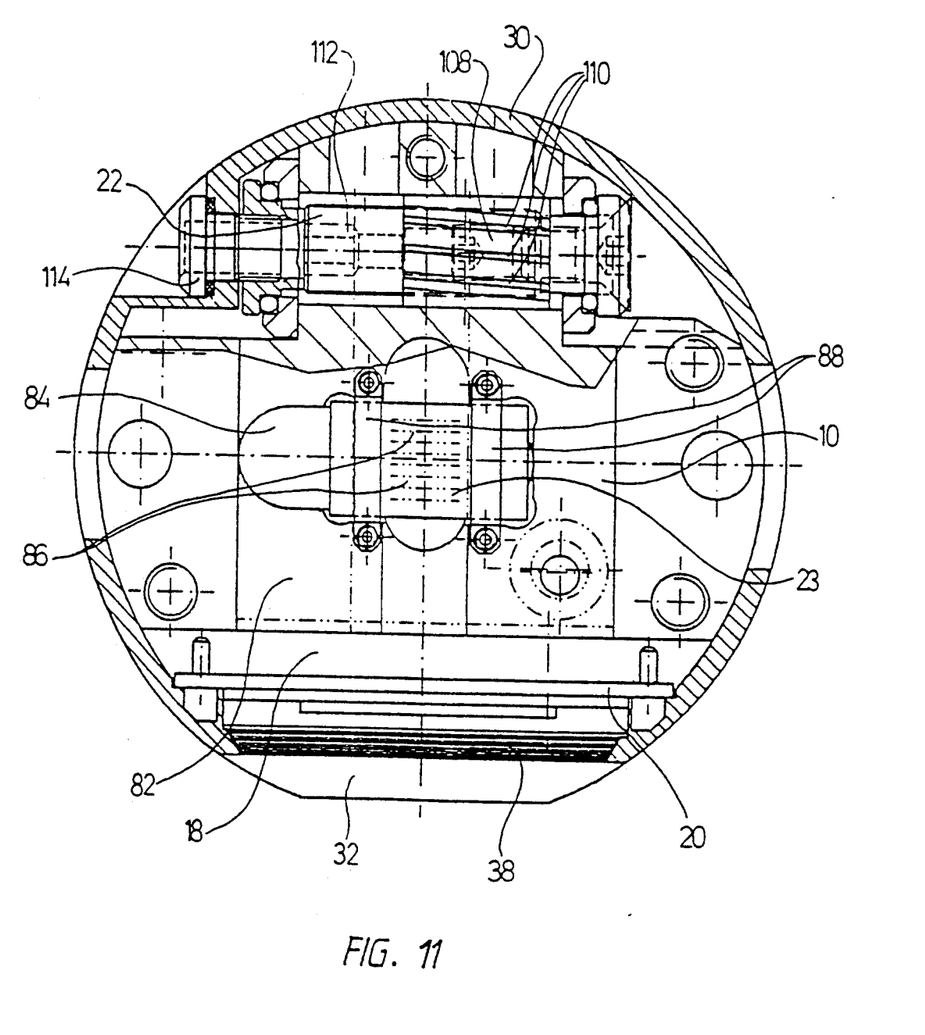
FIG. 11 is a cross-sectional view taken along the section line 11—11 of FIG. 10.

The digital display is missing in the exemplary embodiment illustrated in FIGS. 6 and 7. A diffuser ring 62 equipped with transmitting and receiving elements for infrared radiation is embedded in its place in an outwardly open annular groove 60 in the metal ring 30. The diffuser ring is electrically connected to a transmitting and receiving electronics device 66 arranged in a further recess 64 of the main body 10. Infrared light can be transmitted and received by and all-around the diffuser ring even when the tool head rotates at a high speed. The transmitting electronics device 66 is, just like the transmitting and evaluating electronics device 20, protected against external electric fields by the metal shell 30 and is sealed off to the outside to prevent undesired entry of liquid. Communication with the electronics arranged in the tool head is facilitated by a remote-control device 70 also equipped with a transceiver for infrared radiation, on which remote-control device are arranged, among others, a digital display 72 to show the displacement path of the slide in the tool head and diverse operating knobs 74 for turning the device on and off and to change the scale. In order to facilitate a versatile use, the remote-control device 70 is constructed as a hand-held, battery-operated device. In order, for example, to carry out a statistical control process, the remote-control device can furthermore be equipped with a microprocessor-supported circuit arrangement, in which measurement data can be stored, if necessary can be printed out and/or can be transmitted to a central processor for a further statistical evaluation. It is also possible to equip the remote-control device 70 with an external data port for facilitating communication with an external processor.

The metallic main body 10 has, in the exemplary embodiment illustrated in FIGS. 8 to 11, a planar surface 82 extending perpendicular with respect to the axis of rotation 80 of the tool, which planar surface has in its central area a recess 84 to receive the sensor 23. The sensor 23 consists of a glass carrier, onto the active surface of which a measuring device is baked or applied using a thin-layer technique. Laterally spaced mounting bars 88 are glued next to the measuring device 86 onto the active side of the glass carrier and are fastened, preferably clamped at their free ends which project beyond the edges of the glass-carrier, to the mounting surface 82 of the main body 10. This fastening technique ensures that the active surface of the glass carrier is exactly aligned with the mounting surface and that the differences in thermal expansion between the main body and the glass carrier can be compensated for without a risk of breakage to the glass carrier.

The measuring scale 24 has also a glass carrier which is fastened to a planar mounting surface 90 of the slide 14, which mounting surface is exactly perpendicular with respect to the axis of rotation 80, in such a manner so as to facilitate a compensation for differences in thermal expansion. The active surfaces of the measuring scale 24 and of the sensor 23, which active surfaces face one another, are, if necessary, spaced from one another by a gap distance of 10 to 20 $\mu$m, which gap distance is filled with a highly viscous dielectric. It is through these measures that an arrangement of the sensor and of the measuring scale is achieved which is neutral with respect to centrifugal force and which guarantees a speed-independent length measurement in the $\mu$-range.

The battery compartment 46 is arranged radially aligned directly adjacent the sensor 23 in the main body 10. The battery compartment receives therein a flashlight battery 44'. The battery 44' is supported at its radially outwardly facing ground pole 92 by a radially movable screw plug 94 and at its positive pole arranged near the axis, particularly at its top face, by a pole pin 102 movable against the force of a spring 100 in an insulated plastic insert 98. The spring 100 is initially radially tensioned in direction of the axis of rotation 80 such that the pole pin 102 arranged near the axis is not lifted off from the battery pole 96, not even under the action of centrifugal force active during a high-speed rotation of the tool.

An externally accessible plug socket 104 is provided on the side of the plastic insert 98 which is radially opposite the battery. The plug socket 104 is connected to the electronics device and is used as an external data port for data transmission from and to an external data acquiring or processing device.

The shell clamped between the shoulders 32 and 34 consists, in the exemplary embodiment according to FIGS. 8 to 11, of an impact resistant, preferably glass fiber reinforced plastic. It has a flat face 106 thereon which is recessed with respect to the cylindrical outer contour of the shell and is protected from outside mechanical influences by radially projecting parts 32', 34' on the shoulders 32, 34. The flat face 106 of the shell houses the transparent viewing window 38 and the switches 48, 50. The viewing window is glued from inside into a recess in the shell.

In order to keep the center area of the tool head available for the centrifugal force-neutral storing of the measuring scale 24, for the sensor 23 and for the battery 44', the adjusting mechanism for the slide 14 is arranged off-center in the main body and in the slide. The adjusting mechanism contains an axially fixed, adjusting spindle 22 rotatably supported in the main body, on which spindle is a guiding structure 108 in the form of a helically extending tooth system 110. The spindle 22 is operated through a hexagonal socket 112 which can be accessed by a suitable wrench through an opening in a support screw 114. The helical tooth system 110 mates with a complementary helical tooth system 116 on a counterpart 118 arranged on the slide 14. In order to achieve a clearance free and precise alignment of the helical tooth systems 116 and 110, the counterpart 118 is first floatingly connected to the slide 14 and is mated with the helical tooth system 110. The space 120 between the counterpart 118 and the slide 14 is then filled with a moldable resin.

The electronics device 20 contains a special component for the measurement signal evaluation of the capacitive length measuring device. The evaluation technique is chosen such that an exactness in the length measurement of approximately 0.2 $\mu$m is achieved. With this, considering the otherwise still existing tolerances, it is possible to guarantee exact measurements to within 1 $\mu$m in diameter. The electronics device furthermore includes a microprocessor, a data store and software especially developed for the precision rotary tool. Data input can take place either through the switches 48, 50 or through the external data port 104. With this, among others, the following functions are possible:

Storing an identification number for the tool, which number can be called into the digital display;

displacement path display, which can be set to zero in any desired positions of the slide;

absolute position display of the slide, in the zero position of which the tool is balanced by the device;

storing a real measurement, which can be called into the digital display and can be individually adjusted for a tool insert on the precision rotary head;

battery monitoring with charge-control display;

automatic error and interference displays, in particular upon reaching a concretely suggested adjustment limit.

Furthermore, there exists because of software the possibility to store tool data over long periods of time, in particular in order to enable an operating data acquisition or an error diagnosis. The evaluation of these data can take place after down loading the data through the external data port 104 to a separate computer.

Figure 12:
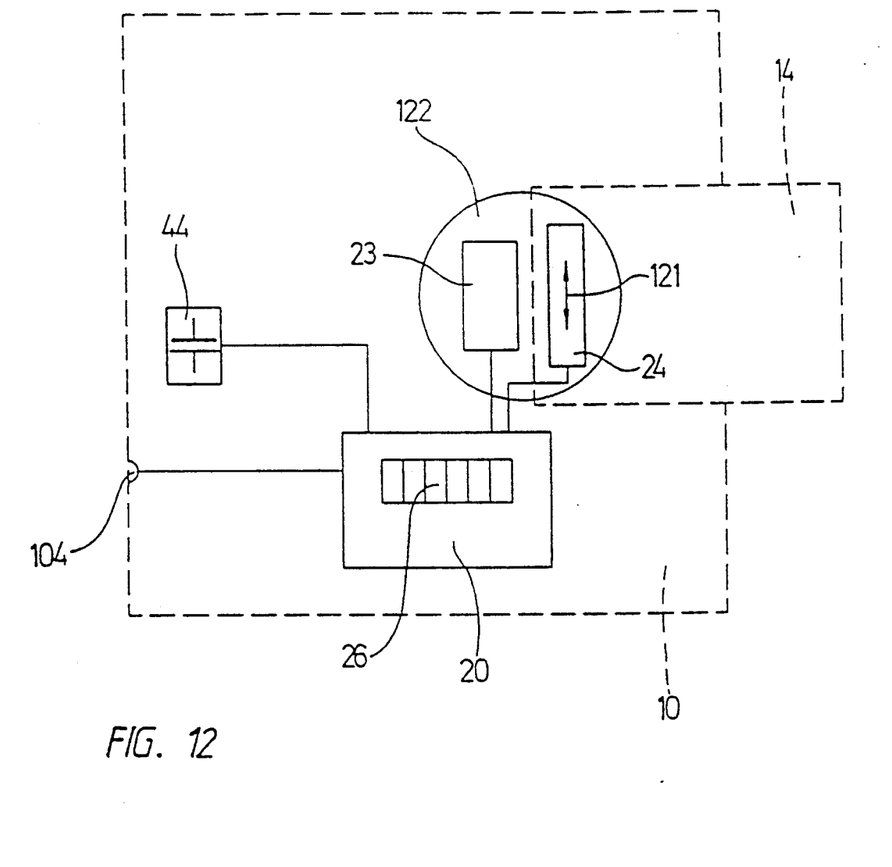
FIG. 12 is a diagram of the precision rotary head according to FIGS. 8 to 11.

FIG. 12 shows a schematic block diagram of a precision rotary head according to FIGS. 8 to 11. A slide 14 is arranged movably in direction of the double arrow 121 on the main body 10 of the precision rotary head. The displacement position is directly measured with the help of a capacitive measuring system 122 connected to the scanning and evaluating electronics device 20 and consisting of a slide-fixed measuring scale 24 and main-body-fixed sensor 23, the relative displacement being displayed in a digital display 26 integrated into the tool head. Current is supplied by a battery 44 arranged in the main body 10. An external data port 104 assures that a data exchange with the scanning and evaluating electronics device is possible.

Figure 13:
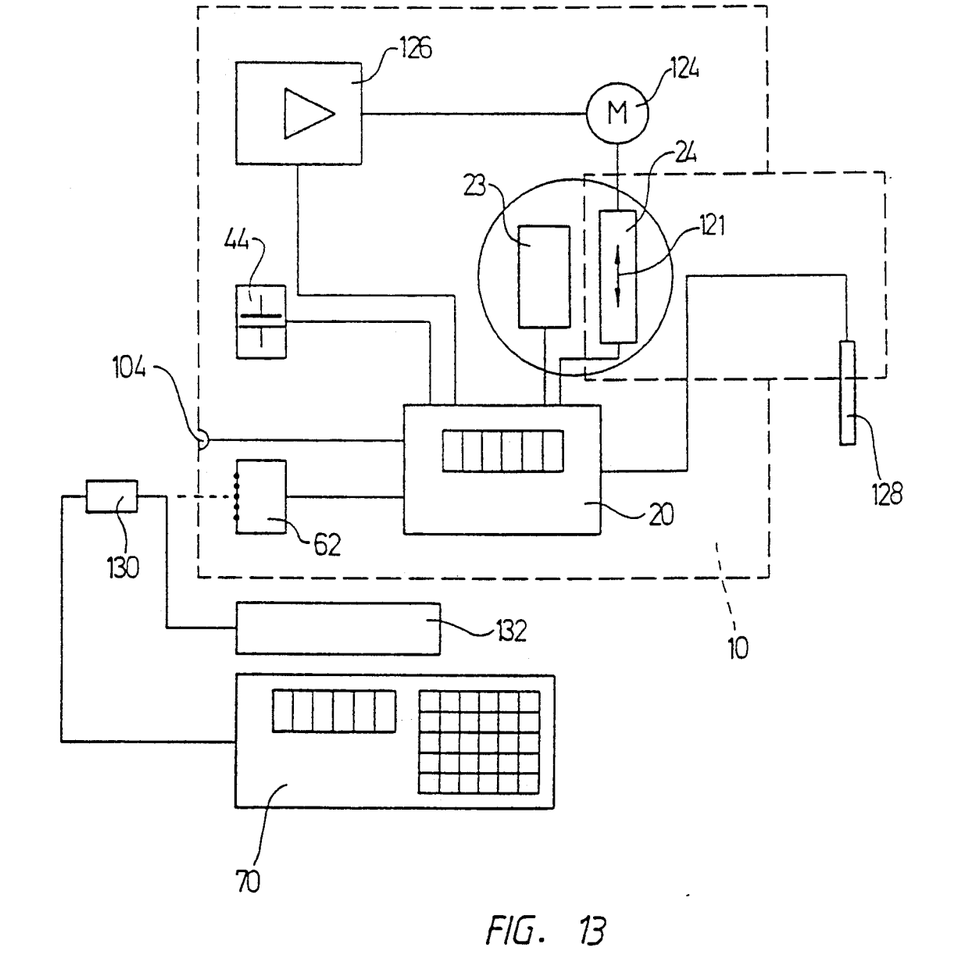
FIG. 13 is a diagram of a remote-controllable, precision rotary head having an integrated servomotor and a primary element.

The diagram according to FIG. 13 shows a further block diagram for the precision rotary head: The slide 14 is movable in direction of the double arrow 121 relative to the main body 10 by a servomotor 124 integrated into the main body. The servomotor is controlled by an electronic control device 126, which in turn is controlled by a control and regulating circuit coupled to the scanning and evaluating electronics device 20. The regulated or standard quantities reach either through a primary element 128 arranged on the outside of the slide 14 the direct workpiece measurement or directly through an optoelectronic transceiver 62 the control device connected to the scanning and evaluating electronics device 20. Communication with the transceiver 62 is accomplished by an external transceiver 130, to which can be connected a remote control device 70 and/or an external measuring device 132 for accomplishing workpiece measurement.

We claim:

1. A tool head for use in machine tools comprising a main body rotating about an axis of rotation, at least one slide adjustable relative to the main body and being adapted to carry thereon at least one cutting tool, a device for effecting a direct measuring of the displacement path of the slide relative to the main body and a battery operated scanning and evaluating device for scanning evaluating and displaying the results of the displacement path of the slide, said main body having means defining a recess to receive therein the battery-operated scanning and evaluating device, necessary, with a radially outwardly facing digital display and with at least one of the slide and the main body having a measuring scale thereon and the other of the slide and the main body having a sensor for scanning the measuring scale thereon, said sensor being connected to the scanning and evaluating device, wherein the measuring scale and the sensor are arranged in the direct vicinity of the axis of rotation and have flat surfaces which face one another, said surfaces being separated from one another by a narrow gap, and through which surfaces extends the axis of rotation.

2. The tool head according to claim 1, wherein the surfaces of the measuring scale and the sensor are arranged in planes which are perpendicular with respect to the axis of rotation.

3. The tool head according to claim 1, wherein the gap width is less than 20 μm.

4. The tool head according to claim 1, wherein the gap width is less than 10 μm.

5. The tool head according to claim 1, wherein the measuring scale and the sensor are parts of a capacitive length-measuring device connected to the scanning and evaluating device.

6. The tool head according to claim 1, wherein the gap is filled with a highly viscous dielectric.

7. The tool head according to claim 1, wherein the measuring scale and the sensor each have measuring structures arranged on a flat glass carrier.

8. The tool head according to claim 6, wherein the flat glass carrier of at least one of the sensor and of the measuring scale is glued with its active surface having the measuring structure thereon to two spaced mounting bars, and wherein the free ends of the mounting bars which project beyond an edge of the glass-carrier, are fastened to a mounting surface on the main body, which mounting surface is provided with a recess for receiving therein the glass carrier facing toward the main body.

9. The tool head according to claim 8, wherein recesses for receiving the mounting bars are arranged in the slide.

10. The tool head according to claim 6, wherein the slide has a further mounting surface for the glass carrier of the other of the measuring scale and the sensor, said further mounting surface being aligned perpendicularly with respect to the axis of rotation.

11. The tool head according to claim 10, wherein the glass carrier is mounted onto bolts which project from the further mounting surface, and is pressed flat against the further mounting surface.

12. The tool head according to claim 11, wherein the glass carrier is connected to the further mounting surface by means of a moldable resin.

13. The tool head according to claim 1, wherein the measuring structures are applied to the glass carrier by means of a thin-layer technique.

14. The tool head according to claim 1, wherein at least one of the sensor and the measuring scale is fastened to a mounting surface on the main body, which mounting surface is aligned perpendicularly with respect to the axis of rotation.

15. The tool head according to claim 1, including a radially aligned battery compartment arranged in the main body adapted to receive a flashlight battery therein, the compartment having a pole rod arranged near the axis of rotation and which is radially movable against the force of a radially inwardly, initially tensioned, spring, and a metallic compartment lid serving as a grounded pole, secured to and sealed off against liquid to the main body.

16. The tool head according to claim 15, wherein the pole rod is movably supported in an insulating plastic part inserted into a main body recess.

17. The tool head according to claim 1, wherein the scanning and evaluating device is sealed off by a shell completely surrounding the main body at its periphery, and having a viewing window for viewing a digital display.

18. The tool head according to claim 17, wherein the viewing window is arranged in a flat, radially recessed part of an otherwise cylindrical shell consisting of an impact-resistant plastic.

19. The tool head according to claim 18, wherein in the flat part of the shell there are arranged switches which can be externally operated for controlling the scanning and evaluating device.

20. The tool head according to claim 17, wherein the shell can be clamped between an annular shoulder projecting beyond the main body and at least one of a flanged lid and a flanged ring connectable to the main body.

21. The tool head according to claim 20, wherein the annular shoulder and at least one of the flanged lid and the flanged ring have at least in the area of the flat part of the shell, projections projecting radially beyond the outer surface of the shell.

22. The tool head according to claim 1, including an adjusting mechanism for the slide which includes a spindle supported off-center in the main body and carrying a guide structure in the form of a helical tooth system, and a counterpart provided with a complementary helical tooth system operatively engaging the slide.

23. The tool head according to claim 22, wherein the helically toothed counterpart can be connected in a clearance free, direction-exact orientation against a guide structure and to the slide by means of a moldable resin.

24. The tool head according to claim 1, wherein said sensor can acquire a relative value on the measuring scale representing the displacement path of the slide relative to the main body, which relative value can in various displacement positions of the slide be set to zero, can be stored in a digital store of the scanning and evaluating device and can be called from same into the digital display.

25. The tool head according to claim 1, wherein said sensor can acquire an absolute value on the measuring scale representing the absolute position of the slide relative to the main body, in the zero position of which absolute value the tool is balanced, and which can be stored in a digital store of the scanning and evaluating device and can be called from same into the digital display.

26. The tool head according to claim 1, wherein said sensor can acquire an absolute real measurement value individually associated with an attachment tool, which measurement can be stored in a digital store of the scanning and evaluating device and can be called from same into the digital display.

27. The tool head according to claim 1, including a servomotor arranged in the main body for drivingly moving the slide in displacement direction, said servomotor being controllable through a control device coupled to the scanning and evaluating device.

28. The tool head according to claim 1, including a primary element for the workpiece measurement, which primary element is arranged on the outside on the slide, and can be coupled to the scanning and evaluating device.

29. The tool head according to claim 1, including an optoelectronic transceiver arranged in the main body and connected to the scanning and evaluating device for facilitating a wireless data exchange with a remote-control device having at least one of an external transceiver and a tool-measuring device.

30. The tool head according to claim 1, wherein the scanning and evaluating device is equipped with a microprocessor-supported data acquisition capability, and which has a preferably external data port for the transmission of the stored data.

31. The tool head according to claim 1, including a transmitting and receiving device arranged in a shell of the main body and connected to the scanning and evaluating device, optoelectronic transmitting and receiving elements arranged in at least one of an outwardly open and inwardly closed annular groove and in edge-open recesses of the shell, said at least one of a groove and recesses being distributed over the periphery of the shell, said transmitted and receiving elements being connected to the transmitting and receiving device, and an external remote-control device communicating with the transmitting and receiving elements.

32. The tool head according to claim 31, wherein the transmitting and receiving elements are arranged in a closed diffuser ring countersunk in the annular groove of the shell.

* * * * *

UNITED STATES PATENT AND TRADEMARK OFFICE
CERTIFICATE OF CORRECTION

PATENT NO. : 5,251,511
DATED : October 12, 1993
INVENTOR(S) : Werner MUENDLEIN et al.

It is certified that error appears in the above-identified patent and that said Letters Patent is hereby corrected as shown below:

Column 9, line 20; delete "necessary,".
        line 21; delete "with a radially outwardly facing digital display".
        line 50; change "Claim 6" to ---Claim 7---.
        line 62; change "Claim 6" to ---Claim 7---.

Signed and Sealed this

Tenth Day of May, 1994

*Attest:*

BRUCE LEHMAN

*Attesting Officer*    *Commissioner of Patents and Trademarks*